United States Patent [19]
Ball

[11] 3,913,563
[45] Oct. 21, 1975

[54] CONTRACTION MONITOR
[75] Inventor: Newton E. Ball, Solana Beach, Calif.
[73] Assignee: Medical Instruments & Technology, San Diego, Calif.
[22] Filed: Mar. 8, 1974
[21] Appl. No.: 449,353

[52] U.S. Cl. .............. 128/2 S; 73/71.3; 73/88.5 R; 73/379; 73/DIG. 11; 128/2.05 Z; 356/32
[51] Int. Cl.² .......................................... A61B 5/10
[58] Field of Search ........ 128/2 L, 2 R, 2 S, 2.05 R, 128/2.05 T, 20.6 F, 2.06 R, 2.08, 2.1 R; 73/88.5 R, 88.5 SD, 78, 67, 67.2, 71.1, 71.3, 379, DIG. 11; 356/4, 32

[56] References Cited
UNITED STATES PATENTS

| | | | |
|---|---|---|---|
| 2,769,929 | 11/1956 | Hardway, Jr. | 128/2.05 P |
| 2,913,690 | 11/1959 | McGrath | 73/88.5 R |
| 3,483,861 | 12/1969 | Tiep | 128/2.08 |
| 3,517,999 | 6/1970 | Weaver | 73/88 A |
| 3,518,886 | 7/1970 | Talmo et al. | 73/88.5 R |
| 3,520,294 | 7/1970 | Fuzzell | 128/2 S |
| 3,599,628 | 8/1971 | Abbenante et al. | 128/2.06 F |
| 3,709,030 | 1/1973 | Aselman, Jr. | 73/71.1 |

*Primary Examiner*—William E. Kamm
*Attorney, Agent, or Firm*—Ellsworth R. Roston

[57] ABSTRACT

A contraction monitor includes an optical strain gauge having a frame and a reed flexible with respect to the frame. A light emitting element and a photosensitive element are provided with one of the elements fixed to the frame and the other of the elements carried by the reed to vary the distance separating the elements. The resulting signal from the photosensitive element, which has a magnitude variable with the separation distance, provides an indication of the strain in the reed. Two pair of optical elements can be provided to eliminate common mode variations. The resulting signal can be processed in a differential amplifier having degenerative feedback loops to further swamp temperature sensitive parameters. The sum of the currents from the photosensitive elements can be maintained constant by driving the light emitting elements with the output signal. This provides the output signal with linear characteristics over a relatively wide range of deflections.

30 Claims, 12 Drawing Figures

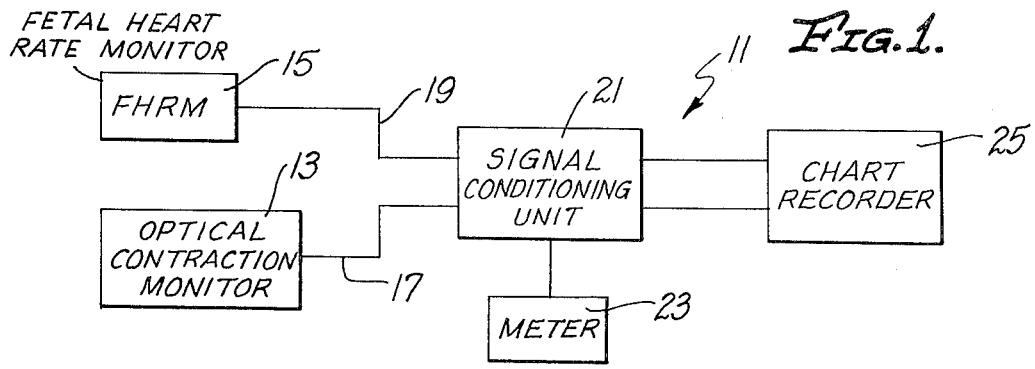
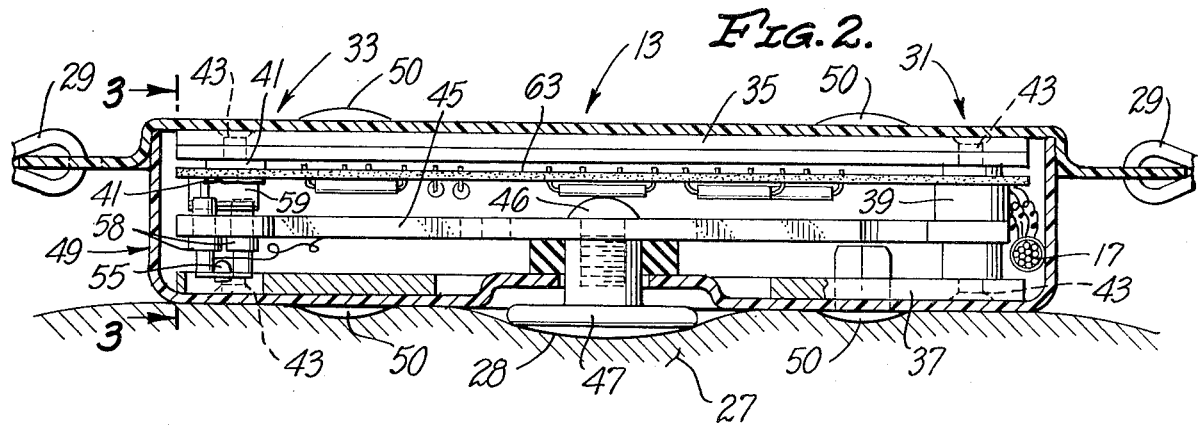
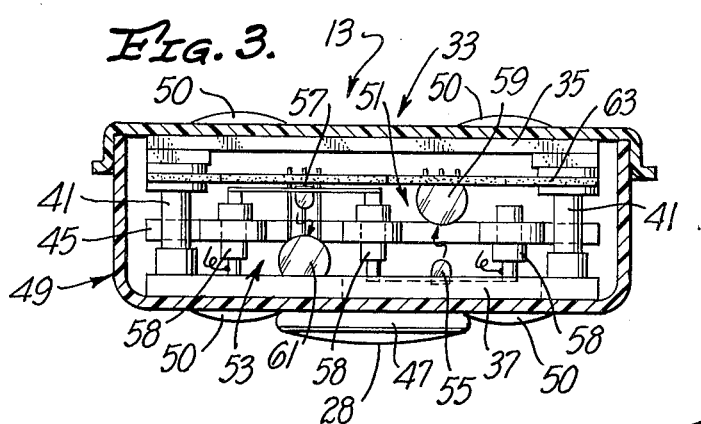
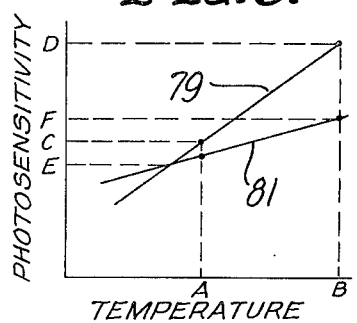
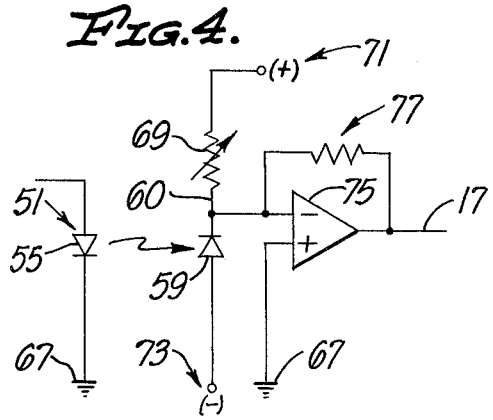
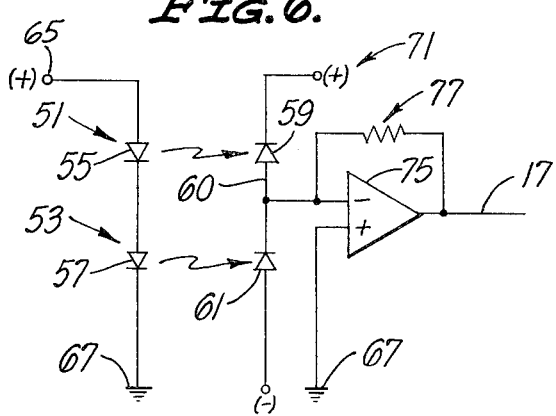

CONTRACTION MONITOR

BACKGROUND OF THE INVENTION

1. Field of the Invention

This invention relates generally to electronic monitoring equipment, and more specifically to apparatus for monitoring the heart rate of a fetus and the contractions of a mother during the labor period.

2. Description of the Prior Art

The period immediately prior to and during which a baby is born is particularly critical not only to the infant but also to the mother. With respect to the infant, movement of the fetus sometimes results in entanglement with the umbilical cord. Such an entanglement can cause a critical reduction in the amount of oxygen supplied to the fetus. The oxygen supply can also be adversely affected by cranial pressures which are exerted upon the fetus during labor.

One way of detecting a reduction in the supply of oxygen to the fetus is by monitoring the heart rate of the fetus. Included among those devices which are available for this purpose is the FETAL HEART RATE MONITOR disclosed and claimed in copending application Ser. No. 449,251, filed on Mar. 8, 1974, and assigned of record to the assignee of record of the present application. This monitor includes a unique voting network which filters the signal from an abdominal sensor to separate the heart rate information from a high degree of artifact noise.

It is also desirable to monitor the contractions of the mother during the labor period. By monitoring the time and the rate at which the contractions occur, one can be given a relatively accurate indication of when the baby will be delivered. This maximizes the probability that a qualified medical staff and appropriate equipment will be available during the critical delivery period.

Contraction monitors of the prior art include sensors which have been placed in contact with the abdominal wall of the mother. These sensors have used strain gauges including reeds fixed at one end and movable at the other end to bend in response to the contractions. These strain gauges have been of the resistance type which commonly include a resistive elementscoated on one side of the reed. When the reed bends, the impedance of the resistive element varies with the magnitude of the contraction. This impedance has then been measured to provide an electrical signal having characteristics which vary with the magnitude of the contraction.

The contraction monitors of the prior art which include the resistance strain gauges have not been particularly accurate. The signals produced by this type of strain gauge are particularly susceptible to drift caused by temperature and environmental changes which affect the resistance of the resistive element. In addition, the resistive elements have been relatively high in cost so that use of the contraction monitors has been limited to exceptional cases.

SUMMARY OF THE INVENTION

In accordance with the present invention, a contraction monitor including an optical strain gauge is provided in conjunction with a fetal heart rate monitor to provide an indication of the condition of both the fetus and the mother during the labor period. The optical strain gauge in the contraction monitor provides a high degree of accuracy which has not been attained by the resistance strain gauges of the prior art. The optical strain gauge can be formed from elements which are relatively inexpensive so that use of the contraction monitor no longer need be restricted to exceptional cases. This contraction monitor can be easily temperature compensated to minimize the drift of the output signal. Furthermore, the relationship between the deflection of the reed in the strain gauge and the magnitude of the output signal can be made substantially linear over a relatively wide range of deflections.

The optical features of the present strain gauge are provided by at least one pair of optical elements each including a light emitting element and an associated photosensitive element. One of the elements in the pair is mounted on the reed of the strain gauge while the other of the elements is mounted on the frame of the strain gauge. In response to the light emitted by the light emitting element, the photosensitive element produces a signal which has a magnitude proportional to the distance separating the elements. Thus the magnitude of the signal produced by the photosensitive element provides an indication of the amount of deflection in the reed. A second pair of light emitting and photosensitive elements can be provided to eliminate common mode variations in the output signal.

In a preferred embodiment, the signals at the outputs of the photosensitive elements are differentially amplified to provide the final output signal for the contraction monitor. Even though the beta/temperature characteristics of the photosensitive elements may differ, the differential amplification of the output signals significantly reduces the effects of temperature on the output signals. Degenerative feedback loops can also be provided to further inhibit adverse temperature effects.

The signals at the outputs of the photosensitive elements can be introduced to an operational amplifier and the resulting output signal can be used to drive the light emitting elements in each of the pairs of optical elements. By maintaining the sum of the output signals from the photosensitive elements at a substantially constant level, the relationship of the output current and the deflection of the reed can be made substantially linear over a relatively wide range of deflections. This feature is of particular advantage in those applications where it is desirable that a percentage increase in the magnitude of the output signal be indicative of a corresponding percentage increase in the magnitude of the deflection.

These and other features and advantages of the present invention will become more apparent with a description of preferred embodiments discussed in conjunction with the associated drawings.

DESCRIPTION OF THE DRAWINGS

FIG. 1 is a block diagram of a combination including a fetal heart rate monitor and an optical contraction monitor for use during the labor period;

FIG. 2 is a side elevational view of one embodiment of the optical contraction monitor of FIG. 1 which includes an optical strain gauge;

FIG. 3 is an end elevation view of the embodiment of the optical contraction monitor illustrated in FIG. 2;

FIG. 4 is a schematic diagram of one embodiment of the contraction monitor of the present invention including a light emitting element and a photosensor;

FIG. 5 is a graph illustrating the photosensitive/temperature characteristics of the photosensor illustrated in FIG. 4;

FIG. 6 is a schematic diagram of a further embodiment of the contraction monitor of the present invention;

DESCRIPTION OF PREFERRED EMBODIMENTS

Figure 7:
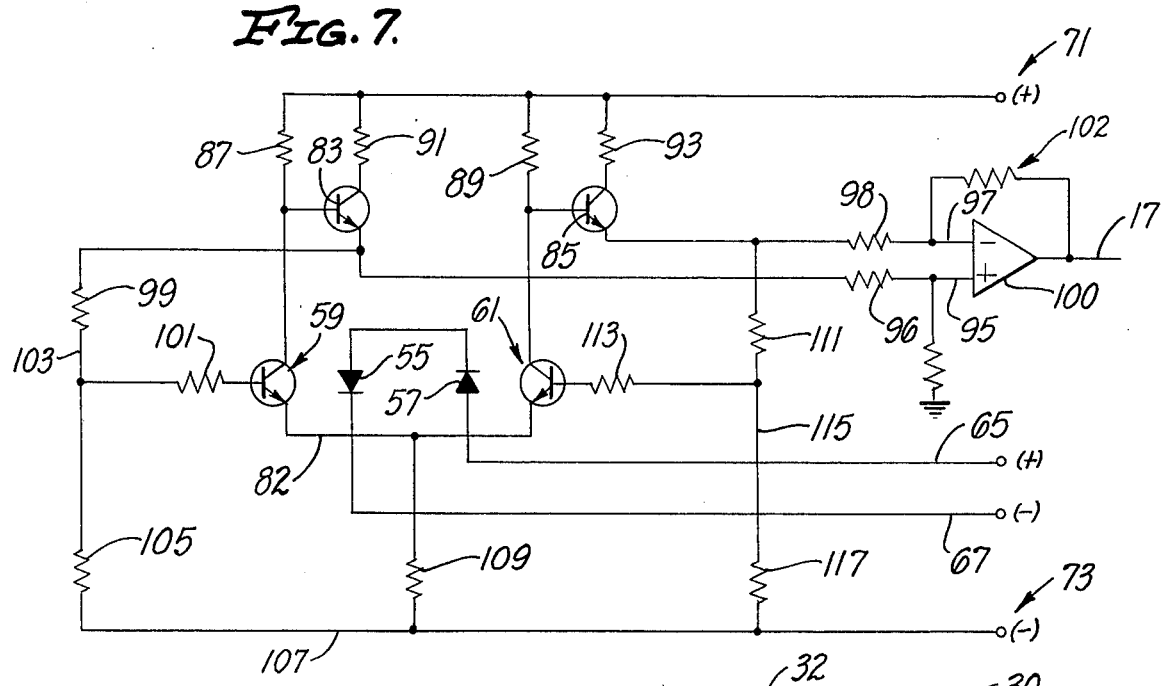
FIG. 7 is a schematic diagram of still a further embodiment of the contraction monitor of the present invention.

An apparatus for monitoring fetal heart rates and maternal contractions is illustrated in FIG. 1 and designated generally by the reference numeral 11. The apparatus 11 includes an optical contraction monitor 13 and a fetal heart rate monitor 15. The optical contraction monitor 13 provides on a conductor 17 an output signal which typically has analog characteristics and a magnitude which varies with the magnitude of the maternal contraction. The fetal heart rate monitor 15 provides on a conductor 19 an output signal defined by a single pulse for each heart beat of the fetus. These signals on the conductors 17 and 19 are introduced to a signal conditioning unit 21 having associated therewith a meter 23. The meter 23 provides an instantaneous indication of the relative magnitude of the signal on the conductor 17.

In response to the output signal from the heart rate monitor 15, the signal conditioning unit 21 generates a signal having a direct current potential proportional to the frequency of the pulse rate. In response to the analog output signal from the contraction monitor 13, the signal conditioning unit 21 provides gain and bias adjustments to scale the analog signal into the chart recorder 25. The signal conditioning unit 21 will typically include a plurality of filters having a relatively slow response to reduce the frequency response of the analog signal from the contraction monitor 13.

The fetal heart rate monitor 15 is preferably of the type disclosed and claimed in copending application Ser. No. 449,151, filed on Mar. 8, 1974 and assigned of record to the assignee of record of the present application. This heart rate monitor 15 includes an ultrasonic transducer (not shown) which is placed in contact with the abdominal wall of the mother to provide a signal characterized by heart rate information disguised in a high degree of artifact noise. The heart rate monitor 15 also includes a voting network which is particularly advantageous for filtering the artifact noise from the heart rate information.

The optical contraction monitor 13 can be embodied in a sensor assembly such as that illustrated in FIGS. 2 and 3. In this embodiment, the contraction monitor 13 is generally longitudinal in configuration with a first end 31 and a second end 33. A belt 29 is fixed to the first and second ends 31 and 33, respectively, to provide means for maintaining the monitor 13 in contact with an abdominal wall 27 of the mother. The belt 29 can be initially provided with a tension which provides a zero indication on the meter 23. Strain sensed by the monitor 13 beyond this level will be displayed on the meter 23 as a contraction. In a preferred embodiment of the apparatus 11, the transducer assembly (not shown) of the monitor 15 is also held in contact with the abdominal wall 27 by the belt 29.

A frame or other supporting means can be provided with a first wall portion 35 and a second wall portion 37. These first and second wall portions 35 and 37 respectively are preferably maintained in a spaced relationship by a pair of posts 39 at the first end 31 and a pair of posts 41 at the second end 33 of the monitor 13. In FIG. 2, the posts 41 have been partially removed to reveal other elements in the assembly. The wall portions 35, 37 are fixed to the posts 39, 41 by a plurality of screws 43. In a preferred embodiment, the frame defined by the wall portions 35 and 37 is formed from aluminum or other rigid material.

A flexible member or reed 45 preferably extends from the first end 31 to the second end 33 in planar relationship between the wall portions 35 and 37 of the frame. At the first end 31, the reed 45 is preferably secured to the posts 39; however, at the second end 33, the reed 45 is unsecured so that it is free to bend between the wall portions 35 and 37 of the frame. Typically, the frame 35, 37 and the reed 45 will be enclosed in a case 49 which has a fixed relationship with the frame 35, 37. A plurality of expandable fasteners 50 can be used to secure the case 49 to the frame 35, 37.

In this embodiment, a button 47, which can be fixed to the reed 45 by a screw 46, extends through the second wall portions 37 and the case 49. When operatively disposed, the case 49 of the monitor 13 will be maintained in contact with the abdominal wall 27 of the mother by the belt 29. This will provide the frame 35, 37 with a substantially fixed relationship with the wall 27. The button 47, extending through the case 49 will also contact the abdominal wall 27. In this orientation, the button 47 will create a depression in the flesh of the wall 27 during the periods between contractions. However, when a contraction occurs, the muscles in the wall 27 will tighten to move the button 47 in the direction of the first wall portion 35 of the frame. Since the button 47 is fixed to the reed 45, a contraction will be accompanied with a corresponding flexure or strain in the reed 45.

Of particular interest to the present invention is a first pair of optical elements 51 best shown in FIG. 3. This pair of optical elements 51 includes means for providing a source of light, such as a light emitting diode 55, and means responsive to the emitted light to provide a signal, such as a photosensor 59. In the embodiment illustrated, a second pair of optical elements 53 includes a diode 57 and a photosensor 61 which perform functions similar to those of the diode 55 and photosensor 59, respectively.

At least one of the diodes 55, 57 and photo sensors 59, 61 in each of the pairs of optical elements 51, 53 respectively, is mounted on the movable end of the reed 45 at the second end 33 of the monitor 13. In a particular embodiment, there may be fewer connections associated with the diodes 55 and 57 than with the sensors 59 and 61. In such an embodiment, it is desirable that substantially fixed relationship with the wall 27. The button 47, extending through the case 49 will also contact the abdominal wall 27. In this orientation, the button 47 will create a depression in the flesh of the wall 27 during the periods between contractions. However, when a contraction occurs, the muscles in the wall 27 will tighten to move the button 47 in the direction of the first wall portion 35 of the frame. Since the button 47 is fixed to the reed 45, a contraction will be accompanied with a corresponding flexure or strain in the reed 45.

In the interest of the mother's comfort, it is desirable that the button 47 maintain a low pressure on the abdominal wall 27. This low pressure can be achieved by providing the button 47 with a particular surface 28 of substantial area for contacting the abdominal wall 27. In addition, the low pressure can be facilitated by maintaining this area of contact substantially constant even during the muscle contractions. In embodiments wherein the button 47 tilts slightly with respect to the abdominal wall, the area of contact can be maintained substantially constant by providing the particular surface 28 with a convex configuration.

In a preferred embodiment, the reed 45 is also provided with a special configuration so that the button 47 tends to move substantially perpendicular to the abdominal wall 27. This also maintains the area of contact between the button 47 and the wall 27 substantially constant.

Figure 11:
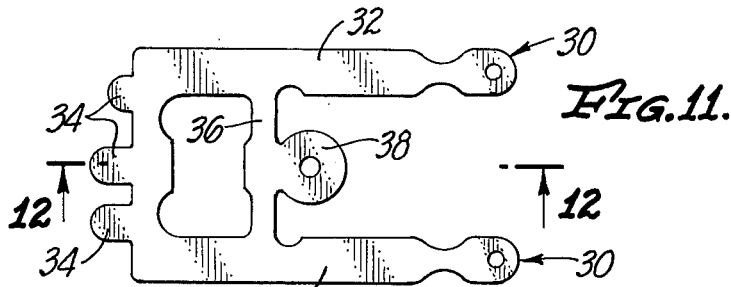
FIG. 11 is a plan view of a reed included in the strain gauge illustrated in FIG. 2.
Figure 12:
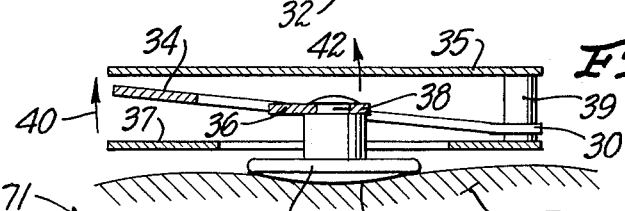
FIG. 12 is a side elevational view of the frame and the reed included in the embodiment of FIG. 2, illustrating the pivotal action of the reed in response to a muscle contraction.

The reed 45, illustrated in FIG. 11, includes a pair of lugs 30 at the first end 31 which are operably secured to the posts 39 (FIG. 2). This provides the lugs 30 with a fixed relationship with the wall portion 35, 37. A pair of arms 32 extend from the lugs 30 to support lugs 34 at the second end 33 of the reed 45. The lugs 34 are movable with the button 47 in response to a muscle contraction to provide a separation distance between the lugs 34 and the wall portions 35, 37. A crossarm 36 extending between the arms 32 carries a lug 38 on which the button 47 can be supported as shown in FIG. 12.

In response to a muscle contraction in the abdominal wall 27, the button moves toward the wall portion 35 of the frame. This causes the arms 32 to pivot about the lugs 30 in a first direction, as shown by an arrow 40 in FIG. 12. As the button moves toward the wall portion 35, the lug 38 is pivoted about the crossarm 36 in a second direction, shown by an arrow 42, opposite to the first direction.

The highly desirable result of these two pivotal actions of the reed 45 is that the lug 38 maintains a substantially parallel relationship with the wall portion 35, 37 even during muscle contraction. Since the button 47 is mounted with its axis substantially perpendicular to the lug 38, the button 47 tends to move perpendicular to the walls 35, 37 of the frame maintaining a substantially constant area of contact with the abdominal wall 27.

Electrical contact with the diodes 55 and 57 can be made through a plurality of terminals 58. The sensors 59 and 61 can then be disposed on the opposite sides of the reed 45 to receive the light from the respective diodes 55 and 57. The photosensors 59 and 61 can be connected to a printed circuit board 63 which is supported by the posts 39 and 41 in fixed relationship with the frame 35, 37.

This preferred orientation of the pairs of optical elements 51 and 53 can be better understood with reference to the end view of the monitor 13 illustrated in FIG. 3. If one assumes that a light of constant brilliance is emitted by the diodes 55 and 57, then the signal produced by the sensors 59 and 61, respectively, is proportional to the distance separating the elements in each of the pairs 51 and 53. Since the sensors 59 and 61 are disposed on opposite sides of the reed 45, movement of the reed 45 in response to a contraction, upwardly in FIG. 3, will decrease the distance separating the elements in the first pair 51 and will increase the distance separating the elements in the second pair 53. The resulting signals produced by the sensors 59 and 61 can be processed in a manner discussed below to provide an indication of not only the time, but also the period and magnitude of the contractions.

Although the embodiment illustrated in FIGS. 2 and 3 includes two pairs of optical elements 51 and 53, it is apparent that a signal related to contraction period and magnitude can be provided with only a single pair of optical elements, such as the pair 51 illustrated in the schematic of FIG. 4. In this embodiment, the light emitting diode 55 is connected between a source of positive operating potential shown generally at 65 and a reference potential such as ground 67. The photo sensor 59 is illustrated to be a photosensitive diode which is serially connected through a conductor 60 with a resistance 69 between a source of positive operating potential 71, such as 12 volts, and a source of negative operating potential 73, such as −12 volts. The resistance 69, which isolates the conductor 60 from the source of positive operating potential 71, is preferably variable to provide means for balancing the parameters of the circuit.

In this embodiment, the conductor 60 is connected to the negative input terminal of an operational amplifier 75. The positive input terminal of the amplifier 75 can be connected to a reference potential such as ground 67. The amplifier 75 is provided with a resistive feedback loop shown generally at 77 which establishes the gain of the amplifier 75.

It will be noted that the diode providing the sensor 59 in the embodiment of FIG. 4 is back biased. In this orientation, the light from the diode 55 causes the photosensor 59 to leak current across the cathode/anode junction. The magnitude of this leakage current is proportional to the amount of light received by the sensor 59. If the brilliance of the light emitting diode 55 is substantially constant, this amount of light received by the sensor 59 will vary with the distance separating the diode 55 and the sensor 59. With the variable resistance 69 providing isolation, a voltage will result on the conductor 60 which is amplified in the amplifier 75 and the resulting output signal will appear on the conductor 17.

One familiar with the characteristics of photosensitive diodes will appreciate that their photosensitivity varies substantially linearly with temperature as shown by the line 79 plotted in FIG. 5. For example, if the temperature increases from a point A to a point B on the abscissa, the photosensitivity of the diode 59 may increase from a point C to a poing D on the ordinate.

With an increased photosensitivity, the output signal provided by the diode 59 would reflect not only deflection in the reed 45, but also changes in the ambient temperature.

These undesirable temperature effects in the output signal are significantly reduced in the embodiment illustrated in FIG. 6 which includes both the first and second pairs of optical elements 51 and 53, respectively. In this embodiment, both of the light emitting diodes 55 and 57 are serially connected between the source of operating potential 65 and the reference potential such as ground 67. The photosensors 59 and 61 are separated by the conductor 60 and connected between the sources of potential 71 and 73. As in the previous embodiment, the signal on the conductor 60 is amplified to provide the output signal on the conductor 17.

The embodiment of FIG. 6 provides for elimination of common mode variations. In other words, ambient conditions which are common to both of the pairs of the optical elements 51, 53 will not have a significant effect on the characteristics of the output signal. Although the photosensor 61 may have a photosensitive/temperature line 81 which differs slightly from the line 79 plotted in FIG. 5, nonetheless, the conduction of the photosensor 59 on one side of the conductor 60 will vary in approximately the same manner as the conduction of the photosensor 61 on the other side of the conductor 60. As a result, the characteristics of the signal on the conductor 60 will vary only with the difference in the sensitivities of the sensors 59 and 61.

It will be noted that an increase in temperature from the point A to the point B in FIG. 5 will create an increase in the photosensitivity of the sensor 61 from a point E to a point F. At the same time however, the photosensitivity of the sensor 59 will have increased from the point C to the point D. It follows that the magnitude of the signal on the conductor 60 will increase only in proportion to the difference between the distance separating the points E and C and the distance separating the points F and D. Although this difference is accentuated in FIG. 5 for the purposes of explanation, the variations of the output signal with temperature may be reduced from approximately thirty per cent with the embodiment of FIG. 4 to approximately one per cent with the embodiment of FIG. 6.

Although the embodiments illustrated in FIGS. 4 and 6 include photosensors 59 and 61 which are illustrated to be photosensitive diodes, it is apparent that the desirable photosensitive characteristics can be provided by other devices. For example, in FIG. 7, the photosensors 59 and 61 are illustrated to be photosensitive transistors, such as those commonly available under the catalogue number L14E2. In this embodiment, the emitters of the photosensors 59 and 61 are connected through a conductor 82.

In addition to providing a signal responsive to the proximity of a light source, the photosensitive transistors 59 and 61 also provide some amplification for these signals. Further amplification can be provided by connecting the collector of the sensor 59 to the base of a transistor 83, and connecting the collector of the sensor 61 to the base of a transistor 85. The bases of the transistors 83 and 85 can also be connected through biasing resistors 87 and 89, respectively, to the source of positive operating potential 71.

Current limiting resistors 91 and 93 can be connected between the source of potential 71 and the respective collectors of the transistors 83 and 85. In this emitter follower configuration, the transistors 83 and 85 provide power amplification with a unity voltage gain to buffer the output signals provided on their respective emitter terminals. These output signals from the transistors 83 and 85 are introduced on a pair of conductors 95 and 97, respectively, to an operational amplifier 100 which provides the output signal on the conductor 17. In this configuration, the current limiting resistors 91 and 93 provide means for protecting the respective transistors 83 and 85 in the event the conductors 95 and 97 become shorted. The current in the output signals can also be limited by a pair of resistors 96 and 98 provided in the output conductors 95 and 97 respectively. In combination with a resistive feedback loop 102, the resistors 96 and 98 determine the gain of the amplifier 100.

A degenerative feedback loop is connected with the output conductor 95 to the base of the photosensor 59. This loop includes a resistance 99 connected to a resistance 101 through a conductor 103. The conductor 103 is connected through a resistance 105, a conductor 107, and a resistance 109, to the conductor 82. This provides appropriate bias and gain control for the photosensor 59. A similar degenerative feedback loop is connected from the conductor 97 to the base of the photosensor 61. This loop also includes a resistance 111 which is connected to a resistance 113 through a conductor 115. A resistance 117 is connected between the conductors 115 and 107 to appropriately bias and control the gain of the photosensor 61. The conductor 107 is additionally connected to the source of negative operating potential 73.

It is well known that degenerative feedback loops, such as those associated with the photosensors 59 and 61, reduce the current gains of the associated transistors. For example, the current gain of a transistor may be reduced from approximately 100–200 to only 5 with the use of a degenerative feedback loop. In the present invention, these characteristics are useful to swamp the forward gain parameters of the associated temperature dependent transistors.

In addition to having a photosensitivity which varies with temperature, the current gain of a photosensitive transistor also varies with temperature. For this additional reason, the common mode variation provided by an embodiment including both the first and second pairs of optical elements 51 and 53, respectively, can be of even further advantage when the photosensors 59 and 61 are photosensitive transistors.

Figure 8:
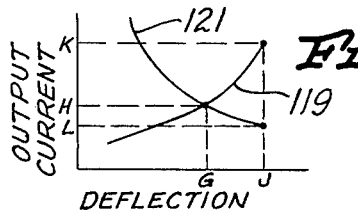
FIG. 8 is a graph illustrating the output current/deflection characteristics of a pair of photosensors associated with the optical strain gauge of the present invention.

The curves plotted in FIG. 8 illustrate the variations in the output current of the photosensors 59 and 61 in response to displacement of the reed 45 in the strain gauge of the monitor 13. As the reed 45 is bent in the direction of the first wall 35 of the frame (upwardly in FIG. 3) the diode 55 moves closer to the associated photosensor 59. This provides the photosensor 59 with a leakage current which increases at an increasing rate as shown by the curve 119 in FIG. 8. In contrast, movement of the reed 45 in the direction of the first wall 35 of the frame increases the distance separating the diode 57 and the associated photosensor 61. Thus the output current of the photosensor 61 decreases at a decreasing rate as shown by the curve 121 in FIG. 8.

Figure 9:
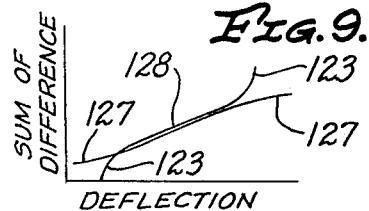
FIG. 9 is a graph illustrating the "sum of the difference" /deflection characteristics of the photosensors associated with the curves illustrated in FIG. 8.

In the common mode and differentially amplified embodiment of FIG. 7, the magnitude of the output signal on the conductor 17 will vary with the "sum of the difference" of the curves 119 and 121. This "sum of the difference" is plotted in FIG. 9 as the curve 123.

For some applications it may be desirable that a particular percentage of variation in the magnitude of the output signal corresponds to the same percent of variation in the deflection of the reed 45. In other words, it may be desirable that the "sum of the difference" curve plotted in FIG. 9 vary linearly with the deflection. It will be noted that the curve 123 has a relatively narrow linear portion 125 located centrally of the curve. As the deflection increases beyond the portion 125, the "sum of the difference" increases at an increasing rate. As the deflection falls below the central portions 125, the "sum of the difference" decreases at an increasing rate.

Figure 10:
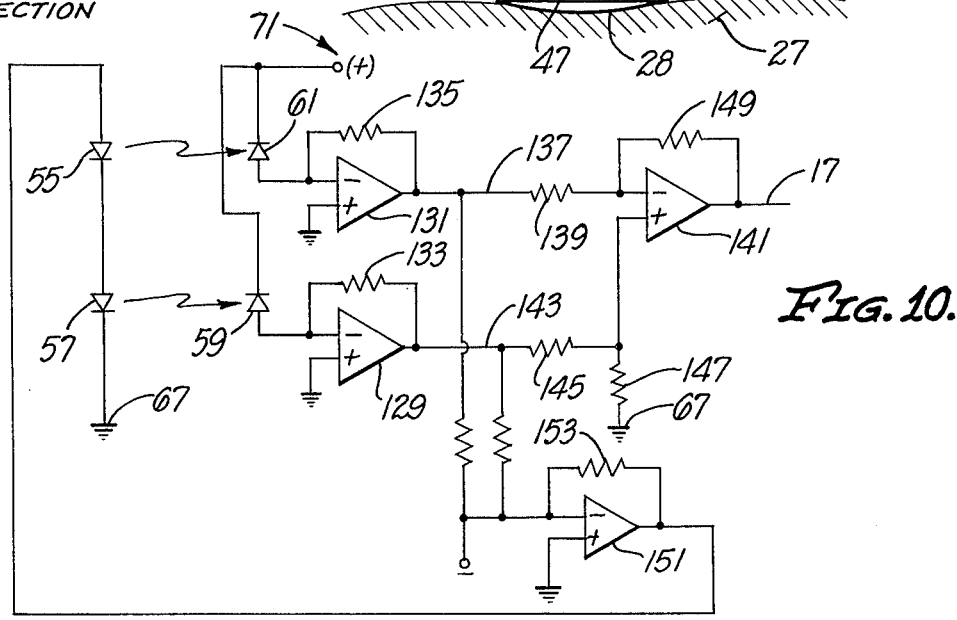
FIG. 10 is a schematic of still a further embodiment of the optical contraction monitor of the present invention.

A preferred embodiment illustrated in FIG. 10 provides the monitor 13 with a "sum of the difference" curve 127 which has a central portion 128 which varies linearly over a relatively wide range. It will be noted that the ends of the curve 127 bend in a direction opposite to that of the associated ends of the curve 123. Thus, with increasing deflection from the central portions 128, the "sum of the difference" curve 127 increases at a decreasing rate; and with decreasing deflection from the portions 128, the "sum of the difference" curve 127 decreases at a decreasing rate.

This feature which provides the "sum of the difference" curve 127 with a relatively wide linear region 128, is enhanced by maintaining the sum of the output currents of the sensors 59 and 61 at a substantially constant level by varying the brilliance of the light emitting diodes 55 and 57. Referring now to FIG. 10, it will be noted that the photosensors 59 and 61 are respectively connected from the negative terminal of an associated operational amplifier 129 and 131 to the positive source of operating potential 71.

Each of the positive input terminals of the amplifiers 129 and 131 are connected to the reference potential such as ground 67. The amplifiers 129 and 139 also have corresponding resistive feedback loops 133 and 135 which control the gain of the associated amplifiers 129 and 131, respectively.

The output of the amplifier 131 is connected through a conductor 137 and an input resistance 139 to the negative input terminal of an operational amplifier 141. Similarly, the output of the amplifier 129 is connected through a conductor 143 and an input resistance 145 to the positive input terminal of the amplifier 141. This positive input terminal is also connected through a resistance 147 to a reference potential such as ground 67. A resistive feedback loop 149 in combination with the resistances 139 and 145 control the gain of the amplifier 141.

It is the signals on the conductors 137 and 143 which are combined and introduced to the negative input terminal of an amplifier 151. The amplifier 151 is provided with a resistive feedback loop 153 and its positive input terminal is grounded for the reasons previously discussed. It is of particular interest to note that the output signal generated by the amplifier 151 is used in this particular embodiment to drive the light emitting diodes 55 and 57.

For the purposes of explanation, it will be assumed that the deflection of the reed 45 corresponds to a point G in FIG. 8 defined by the intersection of the curves 119 and 121. At this point G, both of the photosensors 59 and 61 provide on the respective conductors 143 and 147 output currents illustrated by the point H which may have, for example, equal magnitudes of 9 milliamps. Note that in this quiescent state, the sum of these two currents, 18 milliamps, is introduced to the negative input terminal of the amplifier 151. If the deflection increases from the point G to a point J, the output current associated with the sensor 59 and the curve 119 will increase at an increasing rate to a point K. At the same time, the output current associated with the sensor 61 and the curve 121 will decrease at a decreasing rate to the point L. Thus the current on the conductor 143 may increase to a value such as 12 milliamps while the current on the conductor 137 will decrease to a magnitude such as 8 amps. It will be noted that due to the curvature of the curves 119 and 121, the sum of these two output currents is increased to a magnitude of 20 milliamps.

In this particular embodiment, the amplifier 151 would be responsive to this increase to provide an output signal of reduced magnitude. With the introduction of this signal to the series combination of the diodes 55 and 57, the brilliance of their illumination is reduced. This provides a corresponding decrease in the magnitude of the output signals from both the photosensors 59 and 61 until the sum of their output signals is reduced to the quiescent state, such as 18 milliamps. By providing means for maintaining the sum of the output currents substantially constant, the "sum of the difference" curve can be provided with the desirable linear characteristics over a relatively wide range of deflections.

Although the optical strain gauge has been discussed with reference to the combination of a contraction monitor 13 and a fetal heart rate monitor 15, it will be appreciated by those skilled in the art that the invention can be otherwise embodied. For this reason, the scope of the invention should be ascertained only with reference to the following claims.

I claim:

1. A contraction monitor adapted to be operatively disposed in contact with the abdominal wall of a mother during labor to sense muscle contractions in the abdominal wall, comprising:

a frame having a substantially fixed relationship with the abdominal wall of the mother;

first means constructed to contact the abdominal wall and responsive to a muscle contraction in the abdominal wall for moving relative to the frame;

first optical means having characteristics for emitting light, the first optical means having a fixed relationship relative to one of the frame and the first means;

second optical means including portions having a fixed relationship with the other of the frame and the first means and operatively coupled to the first means to provide a variable separation in distance from the first optical means dependent upon the movements of the first means relative to the frame, the second optical means having characteristics responsive to the light emitted by the first optical means for providing an output signal having characteristics dependent upon the distance separating the first optical means and the second optical means but substantially independent of any temperature variations in the second optical means; and indicating means responsive to the output signal from the second optical means for providing an indication of the magnitude of the muscle contraction in the abdominal wall of the mother.

2. The monitor recited in claim 1 further comprising:

a first wall portion included in the frame and having a substantially planar configuration;

a second wall portion included in the frame and having a substantially planar configuration, the second wall portion having a substantially fixed spaced relationship with the first wall portion of the frame; and a flexible member included in the first means and disposed between the first wall portion and the second wall portion of the frame, the flexible member having first portions fixed with respect to the frame and second portions movable with the first means with respect to the frame, and a particular one of the first optical means and the second optical means being disposed on the second portions of the flexible member for movement with the first means and the second portions of the flexible member relative to the other one of the first optical means and the second optical means.

3. The monitor set forth in claim 2 further comprising:

a first light emitting element included in the first optical means, the first light emitting element having characteristics for emitting a first light in the direction of the first wall portions of the frame;

a first photosensor included in the second optical means, the first photosensor being responsive to the first light from the first light emitting element to provide a first signal having characteristics dependent upon the magnitude of the muscle contraction; and the indicating means including second means responsive to the first signal from the first photosensor for amplifying the first signal to provide the output signal.

4. The monitor recited in claim 3 further comprising:

a second light emitting element included in the first optical means, the second light emitting element having characteristics for emitting a second light in the direction of the second wall portions of the frame;

a second photosensor included in the second optical means, the second photosensor being responsive to the second light from the second light emitting element to provide a second signal having characteristics dependent upon the magnitude of the muscle contraction;

the second means, being constructed to provide a differential amplification in the characteristics of the first signal from the first photosensor and the second signal from the second photosensor to provide the output signal.

5. The monitor recited in claim 4 wherein:

the first photosensor is constructed and disposed to provide the first signal with an increasing magnitude with muscle contractions of increasing magnitude;

the second photosensor is constructed and disposed to provide the second signal with a decreasing magnitude with muscle contractions of increasing magnitude;

the second means has properties responsive to the increasing magnitude of the first signal and the decreasing magnitude of the second signal to provide the output signal with an increasing magnitude related to increasing differences in the amplitudes of the first and second signals; and third means are provided to regulate the operation of the first and second light emitting elements in accordance with the sum of the first signal and the second signal.

6. The monitor recited in claim 1 wherein the indicating means include second means responsive to the output signal from the second optical means for introducing the output signal to the first optical means in a polarity to regulate the operation of the first optical means in accordance with the characteristics of the output signal for the production in the output signal of characteristics substantially linearly related to the distance between the first optical means and the second optical means over an extended range of such distances.

7. An optical strain gauge for measuring the magnitude of an external force including:

a supporting structure;

first means operatively coupled to the supporting structure and responsive to the external force for deflecting with respect to the supporting structure in a direction substantially perpendicular to the supporting structure to provide in the first means a strain proportional to the magnitude of the external force;

a source of current;

second means including first portions having a fixed relationship with the first means for deflection with the first means and including second portions having a fixed relationship with the supporting structure, the second means having optical characteristics responsive to the current from the source and responsive to variations in the distance between the first and second portions of the second means to provide an output signal having characteristics dependent upon the strain in the first means; and means responsive to the output signal for providing an indication of the magnitude of the external force.

8. The strain gauge recited in claim 7 wherein:

the second means has variable output characteristics dependent upon the distance between the first and second portions of the second means;

third means are associated with the source and the second means and are responsive to the output signal from the second means to provide the current from the source with a substantially constant magnitude regardless of variations in the output characteristics of the second means; and the second means has properties responsive to the current of substantially constant magnitude from the source to provide the output signal with characteristics which vary substantially linearly with variations in the distance between the first and second portions of the second means over a first range of deflections;

wherein fourth means are associated with the second means to provide the output signal with characteristics which vary substantially linearly with variations in the deflection of the first means over a second range of deflections wider than the first range of deflections.

9. The strain gauge recited in claim 7 wherein the second means includes:
a first light emitting element having a fixed relationship to one of the first means and the supporting structure, the first light emitting element being responsive to the source of current to emit a first light;
a first photosensor having a fixed relationship with the other of the first means and the supporting structure, the first photosensor having characteristics responsive to the first light to provide a first signal having characteristics dependent upon the characteristics of the first light and upon the distance between the first light emitting diode and the first photosensor;
a second light emitting element having a fixed relationship with one of the first means and the supporting structure, the second light emitting element being responsive to the source of current to emit a second light;
a second photosensor having a fixed relationship with the other of the first means and the supporting structure, the second photosensor having characteristics responsive to the second light to provide a second signal having characteristics dependent upon the characteristics of the second light and upon the distance between the second light emitting diode and the second photosensor;
the first light emitting element and the first photosensor being disposed and the second light emitting element and the second photosensor being disposed to provide for a decrease in the distance between the first light emitting element and the first photosensor simultaneously with an increase in distance between the second light emitting element and the second photosensor in accordance with the deflections of the first means to provide for an increase in the amplitude of the first signal from the first photosensor at the same time as a decrease in the amplitude of the second signal from the second photosensor; and
third means responsive to the first signal and the second signal for differentially amplifying the first signal and the second signal to provide the output signal.

10. A gauge for measuring strain, including:
a frame;
a flexible member having first portions fixed with respect to the frame and second portions movable with respect to the frame in response to the strain to be measured;
a power source;
first means fixed to at least one of the frame and the second portions of the flexible member and operatively coupled to the power source for emitting light in the direction of at least the other of the frame and the second portions of the flexible member; and
second means fixed to at least the other of the frame and the second portions of the flexible member to be separated from the first means by a distance dependent upon the movement of the second portion of the flexible member, the second means being responsive to the light emitted by the first means to provide an output signal having characteristics dependent upon the distance between the first and second means;
means responsive to the output signal for providing an indication dependent upon the characteristics of such signal; and
control means responsive to the output signal and operatively coupled to the first means for regulating the energizing of the first means in accordance with the characteristics of the output signal to provide, over a wide range of movements of the flexible member, a substantially linear relationship between the characteristics of the output signal and the movements of the flexible member.

11. The gauge recited in claim 10 wherein the frame includes first portions extending on one side of the second portions of the flexible member and second portions extending on the other side of the second portions of the flexible member, and the first means comprises:
a first member mounted on one of the first portions of the frame and the second portions of the flexible member for emitting a first light;
a second member mounted on one of the second portions of the frame and the second portions of the flexible member for emitting a second light;
a first photosensitive member mounted on the other of the first portions of the frame and the second portions of the flexible member, the first photosensitive member being responsive to the first light to provide a first signal with characteristics increased in magnitude with increased movements in the flexible member relative to the frame;
a second photosensitive member mounted on the other of the second portions of the frame and the second portions of the flexible member, the second photosensitive member being responsive to the second light to provide a second signal with characteristics increased in magnitude with decreased movements in the flexible member relative to the frame; and
third means responsive to the first signal from the first photosensitive member and the second signal from the second photosensitive member to provide the output signal in accordance with the difference in characteristics of the first and second signals.

12. The gauge recited in claim 11 wherein the control means include means responsive to the sum of the first and second signals to regulate the energizing of the first and second members in accordance with the sum of the first and second signals to provide, over a wide range of movements of the flexible member, the substantially linear relationship between the characteristics of the output signal and the movements of the flexible member.

13. The gauge set forth in claim 12 wherein the first and second light emitting members are connected in series and wherein means are responsive to the sum of the signals from the first and second photosensitive members to regulate the energizing of the first and second members.

14. The gauge recited in claim 12 wherein the first photosensitive member is constructed to provide in the first signal characteristics which vary with temperature variations in the first photosensitive member and the second photosensitive member is constructed to provide in the second signal characteristics which vary with variations in the temperature of the second photosensitive member, and the second means further comprises:
fourth means for biasing the first photosensitive member, the fourth means including a first degenerative feedback loop coupled to the first photosensitive member and the fourth means to vary the bias in the first photosensitive member in a direction to reduce the the variations in the characteristics of the first signal from the first photosensitive member with variations in the temperature of the first photosensitive member;
fifth means for biasing the second photosensitive member, the fifth means including a second degenerative feedback loop coupled to the second photosensitive member and the fifth means to vary the bias in the second photosensitive member in a direction to reduce the variations in the characteristics of the second signal from the second photosensitive member with the variations in temperature of the second photosensitive member; and
the third means being differentially responsive to the first signal and the second signal to provide the output signal.

15. The gauge set forth in claim 10 wherein means extend from the flexible member to a position external of the frame to respond to the strain and to produce a movement of the flexible member in accordance with such response and wherein means are included for producing a movement of the flexible frame in accordance with the response of such responsive means while maintaining such responsive means in a particular disposition to respond to the strain.

16. The gauge set forth in claim 15 wherein the responsive means includes a button and wherein the means for maintaining the lugs in the particular disposition includes a member fixed at a first position to the frame, at a second position to the button and at a third position to the flexible member to provide compensatory movements at the second and third positions for maintaining the button at a particular angle relative to the frame.

17. In combination for monitoring the heart rate of a fetus and the labor contractions of a mother, comprising:
a fetal heart rate monitor constructed to be coupled to the abdominal wall of the mother and to be responsive to the heart beat of the fetus to provide a first electrical signal having characteristics dependent upon the heart rate of the fetus;
a contraction monitor coupled to the abdominal wall of the mother and including an optical strain gauge having properties for providing a second electrical signal with characteristics dependent upon the magnitude of and the rate of the contractions of the mother;
signal conditioning means responsive to the characteristics of the first signal and the characteristics of the second signal to vary the characteristics of the first electrical signal in accordance with the characteristics of the second electrical signal; and
means responsive to the characteristics of the first electrical signal from the signal conditioning means for providing an indication of such characteristics.

18. The combination recited in claim 17 wherein the optical strain gauge includes:
at least one member for emitting a first light;
at least one sensor movable relative to the light emitting member a distance dependent upon the magnitude of the contraction of the abdominal wall of the mother and responsive to the light emitted by the light emitting member to provide the second electrical signal with particular characteristics dependent upon the distance separating the member and the sensor; whereby
the particular characteristics of the second electrical signal provide an indication of the magnitude of the contraction.

19. The combination recited in claim 18 where:
means are operatively associated with the sensor for providing the particular characteristics of the second electrical signal with linear characteristics related to the distance between the member and the sensor over a wide range of such distances.

20. A contraction monitor for monitoring the contractions of muscles in the abdominal wall of a mother during labor, the monitor including:
a frame constructed to have a substantially fixed relationship with the abdominal wall of the mother;
a flexible member constructed to have first portions fixed with respect to the frame and second portions movable with respect to the frame to provide between the flexible member and the frame a separation distance dependent upon the movement of the second portions of the flexible member relative to the frame;
first means constructed to have a substantially fixed relationship with the second portions of the flexible member and extending from the flexible member to the abdominal wall of the mother, the first means being responsive to the contractions of the muscles in the abdominal wall to vary the separation distance between the second portions of the flexible member and the frame;
second means fixed to at least one of the frame and the second portions of the flexible member for emitting light in the direction of at least the other of the frame and the second portions of the flexible member;
third means fixed to at least the other of the frame and the second portions of the flexible member to be separated from the second means by a distance dependent upon the variable length of the separation distance, the third means being responsive to the light emitted by the first means to provide an output signal and being responsive to the proximity of the second means to provide the output signal with characteristics dependent upon the magnitude of the muscle contractions in the abdominal wall of the mother;
means responsive to the output signal for indicating the contractions of muscles in the abdominal wall of the mother during labor; and
fourth means operatively coupled to the flexible member and the frame and the first means for maintaining the first means in a particular angular relationship to the frame regardless of the variations in the separation distance between the frame and the second portions of the flexible member.

21. A contraction monitor recited in claim 18 wherein the frame includes first portions extending on one side of the second portions of the flexible member and second portions extending on the other side of the second portions of the flexible member, and the second means comprises:
- a first member mounted on one of the first portions of the frame and the second portions of the flexible member for emitting a first light; and
- a second member mounted on one of the second portions of the frame and the second portions of the flexible member for emitting a second light.

22. The contraction monitor recited in claim 19 wherein the third means comprises:
- a first photosensitive member mounted on the other of the first portions of the frame and the second portions of the flexible member, the first photosensitive member being responsive to the first light to provide a first signal with characteristics increasing in magnitude with muscle contractions of increasing magnitude in the abdominal wall of the mother;
- a second photosensitve member mounted on the other of the second portions of the frame and the second portions of the flexible member, the second photosensitive member being responsive to the second light to provide a second signal with characteristics increasing in magnitude with muscle contractions of decreasing magnitude in the abdominal wall of the mother; and
- fourth means responsive on a differential basis to the first signal from the first photosensitive member and the second signal from the second photosensitive member to provide the output signal in accordance with differences in the characteristics of the signals from the first and second photosensitive members.

23. The contraction monitor recited in claim 22 wherein the first light emitting member and the second light emitting member are connected in series, and wherein means are responsive to the sums of the signals from the first and second photosensitive members to provide a control signal, and wherein means are responsive to the control signal to regulate the operation of the first and the second light emitting members to provide a substantially linear interrelationship between the output signal and the magnitude of contractions in the abdominal wall of the mother during labor over a wide range in the magnitude of such contractions.

24. The contraction monitor recited in claim 22 wherein the first photosensitive member is constructed to provide in the first signal a gain which varies with temperature and the second photosensitive member is constructed to provide in the second signal a gain which varies with temperature, and the second means further comprises:
- fifth means for biasing the first photosensitive member, the fifth means including a first degenerative feedback loop coupled to the first photosensitive member to reduce the variations in the gain of the first signal from the first photosensitive member with variations in temperature;
- sixth means for biasing the second photosensitive member, the sixth means including a second degenerative loop coupled to the second photosensitive member for reducing the variations in the gain of the second signal from the second photosensitive member with variations in temperature; and
- the fourth means being differentially responsive to the first signal and the second signal to provide the output signal.

25. A construction monitor adapted to be disposed in contact with the abdominal wall of a mother to measure muscle contractions in the abdominal wall during labor, the monitor comprising:
- a frame including portions having a substantially planar configuration and constructed to be disposed in a substantially parallel relationship with the abdominal wall of the mother;
- a reed having first portions constructed to be pivotal in a first direction with respect to the frame and second portions constructed to be pivotal in a second direction opposite to the first direction simultaneously with the pivotal movements of the first portion of the reed in the first direction;
- means operatively coupled to the reed and to the frame for providing for the pivotal movements of the reed in the first direction with respect to the frame and for providing simultaneously for the pivotal movement of the second portions in the second direction opposite to the first portion;
- a button mounted on the second portions of the reed and constructed to be operably disposed in contact with the abdominal wall of the mother, the button having properties responsive to a muscle contraction and responsive to the pivotal movement of the first portion of the reed in the first direction and simultaneously to the pivotal movements of the second portion of the reed in the opposite direction to move substantially perpendicular to the abdominal wall a distance proportional to the magnitude of the muscle contraction to produce a strain in the reed;
- means carried by the reed for providing a signal having a magnitude proportional to the distance of movement of the button in the direction perpendicular to the abdominal wall; and
- means responsive to the signal provided by the last mentioned means for providing an indication of the magnitude of such signal.

26. The contraction monitor recited in claim 25 wherein the first portions of the reed and the second portions of the reed normally have a substantially parallel relationship with the planar portions of the frame prior to any contractions of the muscles in the abdominal wall of the mother during labor, and the button is constructed to be responsive to the muscle contractions to move the first portions of the reed into a transverse relationship with the planar portions of the frame and to maintain the second portions of the reed in the substantially planar relationship with the planar portions of the frame.

27. The contraction monitor set forth in claim 26 wherein the button has a particular surface constructed to be disposed in contact with the abdominal wall with the particular axis in a particular angular relationship with the abdominal wall, the particular surface having a convex configuration to maintain a substantially constant area of contact with the abdominal wall even with slight variations in the angular relationship of the axis of the button and the abdominal wall.

28. A contraction monitor for monitoring the contractions of muscles in the abdominal wall of a mother during labor, the monitor including:
- a frame having a substantially fixed relationship with the abdominal wall of the mother;
- a flexible member having first portions fixed with respect to the frame and second portions movable with respect to the frame to provide a separation distance between the flexible member and the frame, the separation distance having a length dependent upon the movement of the second portions of the flexible member relative to the frame;

first means having a substantially fixed relationship with the flexible member and extending from the flexible member to the abdominal wall of the mother, the first means responsive to the contractions of the muscles in the abdominal wall to vary the length of the separation distance between the second portions of the flexible member and the frame;

second means fixed to at least one of the frame and the second portions of the flexible member for emitting light in the direction of at least the other of the frame and the second portions of the flexible member;

third means fixed to at least the other of the frame and the second portions of the flexible member to be separated from the second means by a distance dependent upon the variable length of the separation distance, the third means being responsive to the light emitted by the first means to provide an output signal and being responsive to the proximity of the second means to provide the output signal with characteristics dependent upon the magnitude of the muscle contractions in the abdominal wall of the mother;

third portions included in the second portions and responsive to movement of the first means in response to a contraction of the muscles to move in a first direction with respect to the abdominal wall of the mother;

fourth portions included in the second portions for carrying the first means, the fourth portions responsive to movement of the first means in response to a contraction of the muscles to move with respect to the abdominal wall in a second direction opposite to the first direction; whereby the first means carried by the fourth portions of the flexible member moves in a direction substantially perpendicular to the abdominal wall of the mother to maintain the area of contact between the first means and the abdominal wall substantially constant.

29. A contraction monitor for monitoring the contractions of muscles in the abdominal wall of a mother during labor, the monitor including:

a frame having a substantially fixed relationship with the abdominal wall of the mother;

a flexible member having first portions fixed with respect to the frame and second portions movable with respect to the frame to provide a separation distance between the flexible member and the frame, the separation distance having a length dependent upon the movement of the second portions of the flexible member relative to the frame;

first means having a substantially fixed relationship with the flexible member and extending from the flexible member to the abdominal wall of the mother, the first means responsive to the contractions of the muscles in the abdominal wall to vary the length of the separation distance between the second portions of the flexible member and the frame;

second means fixed to at least one of the frame and the second portions of the flexible member for emitting light in the direction of at least the other of the frame and the second portions of the flexible member;

third means fixed to at least the other of the frame and the second portions of the flexible member to be separated from the second means by a distance dependent upon the variable length of the separation distance, the third means being responsive to the light emitted by the first means to provide an output signal and being responsive to the proximity of the second means to provide the output signal with characteristics dependent upon the magnitude of the muscle contractions in the abdominal wall of the mother; and the first means includes a button mounted on the flexible member, the button having a convex surface constructed to contact the abdominal wall of the mother.

30. The contraction monitor recited in claim 28 wherein the third positions of the flexible member are movable with respect to the frame and the fourth positions of the flexible member move relative to the third portions of the flexible member.

* * * * *